(12) United States Patent
Cook et al.

(10) Patent No.: US 8,947,041 B2
(45) Date of Patent: Feb. 3, 2015

(54) BIDIRECTIONAL WIRELESS POWER TRANSMISSION

(75) Inventors: Nigel P Cook, El Cajon, CA (US); Lukas Sieber, Olten (CH); Hanspeter Widmer, Wohlenschwil (CH)

(73) Assignee: Qualcomm Incorporated, San Diego, CA (US)

( * ) Notice: Subject to any disclaimer, the term of this patent is extended or adjusted under 35 U.S.C. 154(b) by 325 days.

(21) Appl. No.: 12/552,110

(22) Filed: Sep. 1, 2009

(65) Prior Publication Data
US 2010/0148723 A1 Jun. 17, 2010

Related U.S. Application Data

(60) Provisional application No. 61/093,692, filed on Sep. 2, 2008, provisional application No. 61/097,859, filed on Sep. 17, 2008, provisional application No. 61/104,218, filed on Oct. 9, 2008, provisional application No. 61/147,081, filed on Jan. 24, 2009, provisional application No. 61/218,838, filed on Jun. 19, 2009.

(51) Int. Cl.
*H02J 7/00* (2006.01)
*H02J 7/02* (2006.01)
(Continued)

(52) U.S. Cl.
CPC .......... *G06K 19/0723* (2013.01); *G06K 7/0008* (2013.01); *G06K 7/10207* (2013.01);
(Continued)

(58) Field of Classification Search
USPC ............. 320/107, 108; 307/104; 336/DIG. 2; 363/21.06, 21.14
See application file for complete search history.

(56) References Cited

U.S. PATENT DOCUMENTS 4,213,103 A 7/1980 Birt
5,239,459 A * 8/1993 Hunt et al. ...................... 700/90
(Continued)

FOREIGN PATENT DOCUMENTS

CN 1256559 A 6/2000
DE 1019714 B 11/1957
(Continued)

OTHER PUBLICATIONS

Fernandez C, et al., "Overview of Different Alternatives for the Contact-Less Transmission of Energy" IECON-2002. Proceedings of the 28th Annual Conference of the IEEE Industrial Electronics Society. Sevilla, Spain, Nov. 5-8, 2002; [Annual Conference of the IEEE Industrial Electronics Society, IEEE, New York,NY, US LNKDDOI: 10.1109/IECON.2002.11, vol. 2, Nov. 8, 2002, pp. 1319-1323, XP001516268.

(Continued)

*Primary Examiner* — Drew A Dunn
*Assistant Examiner* — Steve T Chung
(74) *Attorney, Agent, or Firm* — Knobbe Martens Olson & Bear LLP

(57) ABSTRACT

Exemplary embodiments are directed to wireless power transfer. A wireless power transceiver and device comprise an antenna including a parallel resonator configured to resonate in response to a substantially unmodulated carrier frequency. The wireless power transceiver further comprises a bidirectional power conversion circuit coupled to the parallel resonator. The bidirectional power conversion circuit is reconfigurable to rectify an induced current received at the antenna into DC power and to induce resonance at the antenna in response to DC power.

60 Claims, 10 Drawing Sheets

(51) Int. Cl.
*H01F 27/42* (2006.01)
*G06K 19/07* (2006.01)
*G06K 7/00* (2006.01)
*G06K 7/10* (2006.01)
*G06K 19/077* (2006.01)
*H02J 17/00* (2006.01)

(52) U.S. Cl.
CPC ........ *G06K19/0701* (2013.01); *G06K 19/0702* (2013.01); *G06K 19/0715* (2013.01); *G06K 19/07749* (2013.01); *H02J 17/00* (2013.01)
USPC ............................. 320/108; 320/107; 307/104

(56) References Cited

U.S. PATENT DOCUMENTS

| | | | |
|---|---|---|---|
| 5,276,912 A | 1/1994 | Siwiak et al. | |
| 5,671,133 A | 9/1997 | Fujita et al. | |
| 5,675,232 A * | 10/1997 | Koenck | 307/150 |
| 5,905,360 A * | 5/1999 | Ukita | 320/118 |
| 5,912,552 A * | 6/1999 | Tateishi | 323/285 |
| 5,955,865 A * | 9/1999 | Koike et al. | 320/104 |
| 5,991,172 A * | 11/1999 | Jovanovic et al. | 363/21.14 |
| 6,169,389 B1 * | 1/2001 | Chen | 320/166 |
| 6,243,566 B1 | 6/2001 | Peckham et al. | |
| 6,275,143 B1 * | 8/2001 | Stobbe | 340/10.34 |
| 6,301,128 B1 | 10/2001 | Jang et al. | |
| 6,321,067 B1 | 11/2001 | Suga et al. | |
| 6,373,790 B1 * | 4/2002 | Fujisawa | 368/204 |
| 6,380,801 B1 | 4/2002 | McCartney | |
| 6,400,274 B1 | 6/2002 | Duan et al. | |
| 6,462,647 B1 | 10/2002 | Roz | |
| 6,515,878 B1 | 2/2003 | Meins et al. | |
| 6,646,415 B1 * | 11/2003 | Nebrigic et al. | 320/107 |
| 6,724,263 B2 | 4/2004 | Sugiura | |
| 6,757,182 B2 * | 6/2004 | Smidt et al. | 363/21.14 |
| 6,791,298 B2 * | 9/2004 | Shenai et al. | 320/128 |
| 6,907,231 B2 | 6/2005 | Bhatti | |
| 7,071,792 B2 | 7/2006 | Meck | |
| 7,088,971 B2 | 8/2006 | Burgener et al. | |
| 7,307,475 B2 | 12/2007 | Coleman | |
| 7,372,775 B2 | 5/2008 | Hayashi | |
| 7,518,267 B2 * | 4/2009 | Baarman | 307/150 |
| 7,535,362 B2 | 5/2009 | Moser et al. | |
| 7,612,527 B2 * | 11/2009 | Hoffman et al. | 320/107 |
| 7,741,734 B2 | 6/2010 | Joannopoulos et al. | |
| 7,747,228 B2 | 6/2010 | Kasha et al. | |
| 7,825,543 B2 | 11/2010 | Karalis et al. | |
| 7,917,104 B2 | 3/2011 | Manssen et al. | |
| 2001/0030581 A1 * | 10/2001 | Dent | 330/297 |
| 2002/0096568 A1 | 7/2002 | Arisawa | |
| 2002/0140403 A1 * | 10/2002 | Reddy | 320/162 |
| 2003/0214821 A1 | 11/2003 | Giannopoulos et al. | |
| 2005/0029351 A1 | 2/2005 | Yoshinaga et al. | |
| 2005/0134213 A1 * | 6/2005 | Takagi et al. | 320/108 |
| 2006/0187049 A1 | 8/2006 | Moser et al. | |
| 2006/0290475 A1 | 12/2006 | Murdoch et al. | |
| 2007/0008140 A1 | 1/2007 | Saarisalo et al. | |
| 2007/0010217 A1 | 1/2007 | Takahashi et al. | |
| 2007/0120421 A1 | 5/2007 | Boys | |
| 2007/0252441 A1 | 11/2007 | Yamauchi et al. | |
| 2008/0088417 A1 | 4/2008 | Smith et al. | |
| 2008/0122401 A1 * | 5/2008 | Sato et al. | 320/107 |
| 2008/0224655 A1 * | 9/2008 | Tilley et al. | 320/108 |
| 2009/0045772 A1 * | 2/2009 | Cook et al. | 320/108 |
| 2010/0109443 A1 | 5/2010 | Cook et al. | |
| 2010/0184371 A1 | 7/2010 | Cook et al. | |
| 2010/0190435 A1 | 7/2010 | Cook et al. | |
| 2012/0262004 A1 | 10/2012 | Cook et al. | |
| 2014/0001882 A1 | 1/2014 | Cook et al. | |

FOREIGN PATENT DOCUMENTS

| | | |
|---|---|---|
| EP | 0533247 A1 | 3/1993 |
| EP | 1494162 A2 | 1/2005 |
| EP | 1795915 A2 | 6/2007 |
| EP | 1914669 A2 | 4/2008 |
| JP | S6132394 A | 2/1986 |
| JP | S63155826 A | 6/1988 |
| JP | 3239003 A | 10/1991 |
| JP | H04509 A | 1/1992 |
| JP | 07170132 | 7/1995 |
| JP | O7170132 | 7/1995 |
| JP | 7231585 A | 8/1995 |
| JP | 10145987 A | 5/1998 |
| JP | 10256957 | 9/1998 |
| JP | 2000165132 A | 6/2000 |
| JP | 2001309580 A | 11/2001 |
| JP | 2002369415 A | 12/2002 |
| JP | 2003299255 A | 10/2003 |
| JP | 2004194400 A | 7/2004 |
| JP | 2004206245 A | 7/2004 |
| JP | 2004206383 A | 7/2004 |
| JP | 2005026741 A | 1/2005 |
| JP | 2005137040 | 5/2005 |
| JP | 2005536927 A | 12/2005 |
| JP | 2010507142 A | 3/2010 |
| KR | 20050005480 A | 1/2005 |
| KR | 20070039127 A | 4/2007 |
| WO | WO9810836 | 3/1998 |
| WO | WO03105311 * | 12/2003 |
| WO | WO2004070941 | 8/2004 |
| WO | WO2006006142 A1 | 1/2006 |
| WO | 2006022365 A1 | 3/2006 |
| WO | WO2007034421 A2 | 3/2007 |
| WO | WO2009070730 | 6/2009 |
| WO | WO2010062198 A1 | 6/2010 |

OTHER PUBLICATIONS

"Hyperfast Rectifier" International Rectifier, Dec. 31, 2006, XP002576261 Retrieved from the Internet: URL:http://www.irf.com/product-info/datasheets/data/30cth02.pdf>.

Written Opinion—PCT/US2009/055790—ISA/EPO—Dec. 21, 2009.

Fernandez C, et al., "Overview of Different Alternatives for the Contact-Less Transmission of Energy" IECON-2002. Proceedings of the 28th. Annual Conference of the IEEE Industrial Electronics Society. Sevilla, Spain, Nov. 5-8, 2002; [Annual Conference of the IEEE Industrial Electronics Society, IEEE, New York, NY, US LNKDDOI: 10.1109/IECON.2002.11, vol. 2, Nov. 8, 2002, pp. 1319-1323, XP001516268.

"Hyperfast Rectifier" International Rectifier, Dec. 31, 2006, XP002576261 Retrieved from the Internet: URL:http://www.irf.com/product-info/datasheets/data/30cth02.pdf>.

International Search Report—PCT/US2009/055790, International Search Authority—European Patent Office—Dec. 21, 2009.

Kobayashi H, et al., "Current Mode Class-D Power Amplifiers for High Efficiency RF Applications" 2001 IEEE MTT-S International Microwave Symposium Digest.(IMS 2001). Phoenix, AZ, May 20-25, 2001; [IEEE MTT-S International Microwave Symposium], New York, NY : IEEE, US LNKDDOI: 10.1109/MWSYM.2001.967047, May 20, 2001, pp. 939-942, XP001067408.

"MR750 Series, High Current Lead Mounted Rectifiers" ON Semiconductor, Oct. 31, 2000, XP002576260 Retrieved from the Internet: URL:http://www.rose-hulman.edu/{herniter/Data_Sheets/MR750-D.pdf>.

"Surface Mount Schottky Power Rectifier MBRS2040LT3" Motorola Semiconductor, Dec. 31, 1996, XP002576262 Retrieved from the Internet: URL:http://www.datasheetcatalog.net/de/datasheets_pdf/M/B/R/S/MBRS2040LT3.shtml>.

Birca-Galateanu, S., "Low peak current Class E resonant full-wave low dv/dt rectifier driven by a square wave voltage generator", Power Electronics Specialists Conference 1999 (PESC '99), 30th Annual IEEE, Publication Date: Aug. 1999, pp. 469-474, vol. 1.

Low et al., "Design and Test of a High-Power High-Efficiency Loosely Coupled Planar Wireless Power Transfer System," IEEE Transactions on Industrial Electronics, vol. 56, No. 5, May 2009, pp. 1801-1812.

European Search Report—EP13020057—Search Authority—Munich—Oct. 30, 2013.

* cited by examiner

BIDIRECTIONAL WIRELESS POWER TRANSMISSION

CLAIM OF PRIORITY UNDER 35 U.S.C. §119

This application claims priority under 35 U.S.C. §119(e) to:

U.S. Provisional Patent Application 61/093,692 entitled "BIDIRECTIONAL WIRELESS ENERGY TRANSFER" filed on Sep. 2, 2008, the disclosure of which is hereby incorporated by reference in its entirety.

U.S. Provisional Patent Application 61/097,859 entitled "HIGH EFFICIENCY TECHNIQUES AT HIGH FREQUENCY" filed on Sep. 17, 2008, the disclosure of which is hereby incorporated by reference in its entirety.

U.S. Provisional Patent Application 61/104,218 entitled "DUAL HALF BRIDGE POWER CONVERTER" filed on Oct. 9, 2008, the disclosure of which is hereby incorporated by reference in its entirety.

U.S. Provisional Patent Application 61/147,081 entitled "WIRELESS POWER ELECTRONIC CIRCUIT" filed on Jan. 24, 2009, the disclosure of which is hereby incorporated by reference in its entirety.

U.S. Provisional Patent Application 61/218,838 entitled "DEVELOPMENT OF HF POWER CONVERSION ELECTRONICS" filed on Jun. 19, 2009, the disclosure of which is hereby incorporated by reference in its entirety.

BACKGROUND

1. Field

The present invention relates generally to wireless charging, and more specifically to devices, systems, and methods related to wireless charging systems.

2. Background

Typically, each powered device such as a wireless electronic device requires its own wired charger and power source, which is usually an alternating current (AC) power outlet. Such a wired configuration becomes unwieldy when many devices need charging. Approaches are being developed that use over-the-air or wireless power transmission between a transmitter and a receiver coupled to the electronic device to be charged. The receive antenna collects the radiated power and rectifies it into usable power for powering the device or charging the battery of the device.

Situations may exist where, among several chargeable wireless devices, one wireless chargeable device is depleted of operational charge while another wireless chargeable device has sufficient operational charge. Accordingly, there is a need to allow wireless exchange of power from one wireless chargeable device to another wireless chargeable device.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted from a transmitter to a receiver without the use of physical electromagnetic conductors. Power conversion in a system is described herein to wirelessly charge devices including, for example, mobile phones, cordless phones, iPod, MP3 players, headsets, etc. Generally, one underlying principle of wireless energy transfer includes magnetic coupled resonance (i.e., resonant induction) using frequencies, for example, below 30 MHz. However, various frequencies may be employed including frequencies where license-exempt operation at relatively high radiation levels is permitted, for example, at either below 135 kHz (LF) or at 13.56 MHz (HF). At these frequencies normally used by Radio Frequency Identification (RFID) systems, systems must comply with interference and safety standards such as EN 300330 in Europe or FCC Part 15 norm in the United States. By way of illustration and not limitation, the abbreviations LF and HF are used herein where "LF" refers to $f_0$=135 kHz and "HF" to refers to $f_0$=13.56 MHz.

The term "NFC" may also include the functionality of RFID and the terms "NFC" and "RFID" may be interchanged where compatible functionality allows for such substitution. The use of one term or the other is not to be considered limiting.

The term "transceiver" may also include the functionality of a transponder and the terms "transceiver" and "transponder" may be interchanged where compatible functionality allows for such substitution. The use of one term over or the other is not to be considered limiting.

Figure 1:
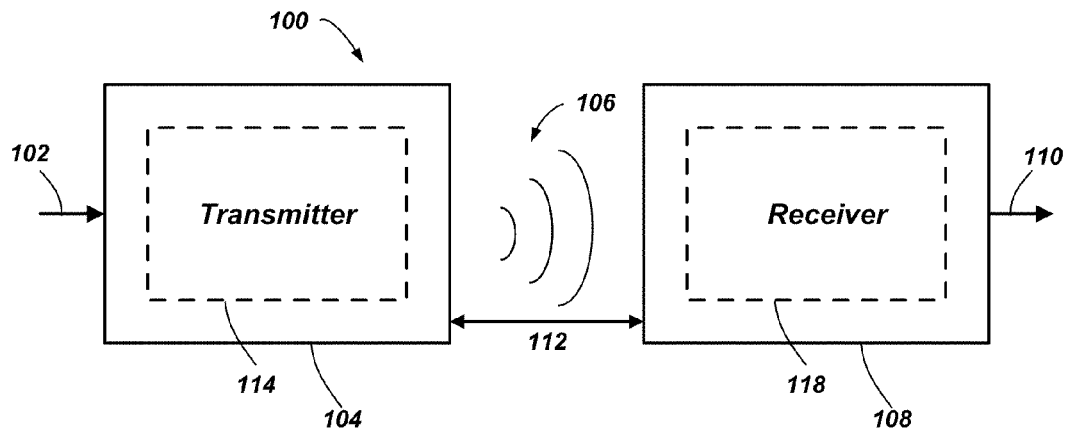
FIG. 1 illustrates a simplified block diagram of a wireless power transmission system.

FIG. 1 illustrates wireless power transmission system 100, in accordance with various exemplary embodiments. Input power 102 is provided to a transmitter 104 for generating a magnetic field 106 for providing energy transfer. A receiver 108 couples to the magnetic field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are matched, transmission losses between the transmitter 104 and the receiver 108 are minimal when the receiver 108 is located in the "near-field" of the magnetic field 106.

Transmitter 104 further includes a transmit antenna 114 for providing a means for energy transmission and receiver 108 further includes a receive antenna 118 for providing a means for energy reception or coupling. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far-field. In this near-field, a coupling may be established between the transmit antenna 114 and the receive antenna 118. The area around the antennas 114 and 118 where this near-field coupling may occur is referred to herein as a coupling-mode region.

Figure 2:
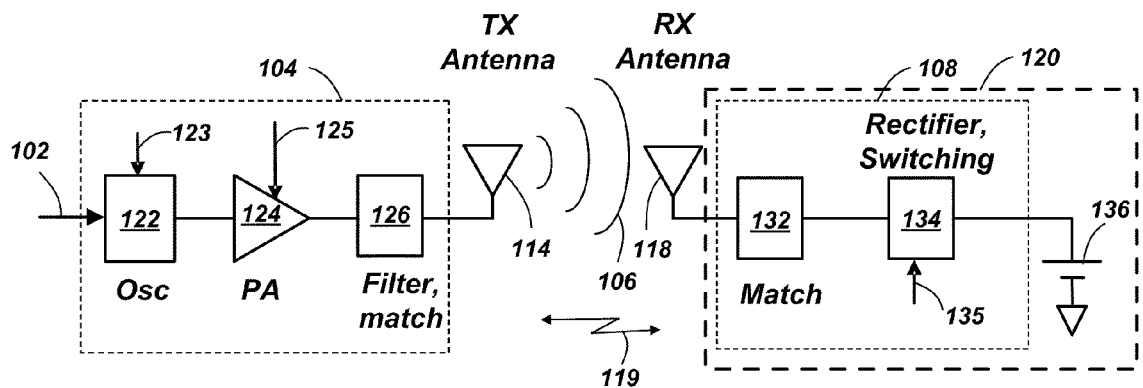
FIG. 2 illustrates a simplified schematic diagram of a wireless power transmission system.

FIG. 2 shows a simplified schematic diagram of a wireless power transmission system. The transmitter 104, driven by input power 102, includes an oscillator 122, a power amplifier or power stage 124 and a filter and matching circuit 126. The oscillator is configured to generate a desired frequency, which may be adjusted in response to adjustment signal 123. The oscillator signal may be amplified by the power amplifier 124 with a power output responsive to control signal 125. The filter and matching circuit 126 may be included to filter out harmonics or other unwanted frequencies and match the impedance of the transmitter 104 to the transmit antenna 114.

An electronic device 120 couples to or includes the receiver 108. Receiver 108 may include a matching circuit 132 and a rectifier and switching circuit 134 to generate a DC power output to charge a battery 136 as shown in FIG. 2 or power host electronics in device 120 coupled to the receiver 108. The matching circuit 132 may be included to match the impedance of the receiver 108 to the receive antenna 118.

A communication channel 119 may also exist between the transmitter 104 and the receiver 108. As described herein, the communication channel 119 may be of the form of Near-Field Communication (NFC). In one exemplary embodiment described herein, communication channel 119 is implemented as a separate channel from magnetic field 106 and in another exemplary embodiment, communication channel 119 is combined with magnetic field 106.

Figure 3:
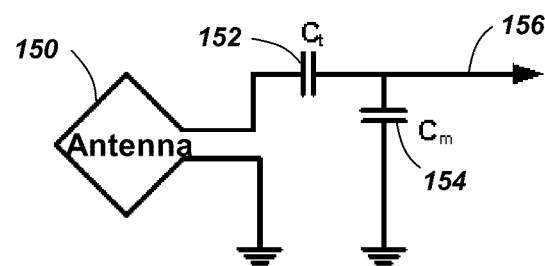
FIG. 3 illustrates a schematic diagram of a loop antenna, in accordance with exemplary embodiments.

As illustrated in FIG. 3, antennas used in exemplary embodiments may be configured as a "loop" antenna 150, which may also be referred to herein as a "magnetic," "resonant" or a "magnetic resonant" antenna. Loop antennas may be configured to include an air core or a physical core such as a ferrite core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more effective.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop antennas is based on the inductance and capacitance. Inductance in a loop antenna is generally the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates a sinusoidal or quasi-sinusoidal signal 156. Accordingly, for larger diameter loop antennas, the size of capacitance needed to induce resonance decreases as the diameter or inductance of the loop increases. Furthermore, as the diameter of the loop antenna increases, the efficient energy transfer area of the near-field increases for "vicinity" coupled devices. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, antennas such as single and multi-turn loop antennas are used for both transmit (Tx) and receive (Rx) antenna systems since most of the environment possibly surrounding the antennas is dielectric and thus has less influence on a magnetic field compared to an electric field. Furthermore, antennas dominantly configured as "electric" antennas (e.g., dipoles and monopoles) or a combination of magnetic and electric antennas is also contemplated.

The Tx antenna can be operated at a frequency that is low enough and with an antenna size that is large enough to achieve good coupling efficiency (e.g., >10%) to a small Rx antenna at significantly larger distances than allowed by far-field and inductive approaches mentioned earlier. If the Tx antenna is sized correctly, high coupling efficiencies (e.g., 30%) can be achieved when the Rx antenna on a host device is placed within a coupling-mode region (i.e., in the near-field or a strongly coupled regime) of the driven Tx loop antenna Furthermore, wireless power transmission approaches may be affected by the transmission range including device positioning (e.g., close "proximity" coupling for charging solutions at virtually zero distance or "vicinity" coupling for short range wireless power solutions). Close proximity coupling applications (i.e., strongly coupled regime, coupling factor typically k>0.1) provide energy transfer over short or very short distances typically in the order of millimeters or centimeters depending on the size of the antennas. Vicinity coupling applications (i.e., loosely coupled regime, coupling factor typically k<0.1) provide energy transfer at relatively low efficiency over distances typically in the range from 10 cm to 2 m depending on the size of the antennas.

Figure 4:
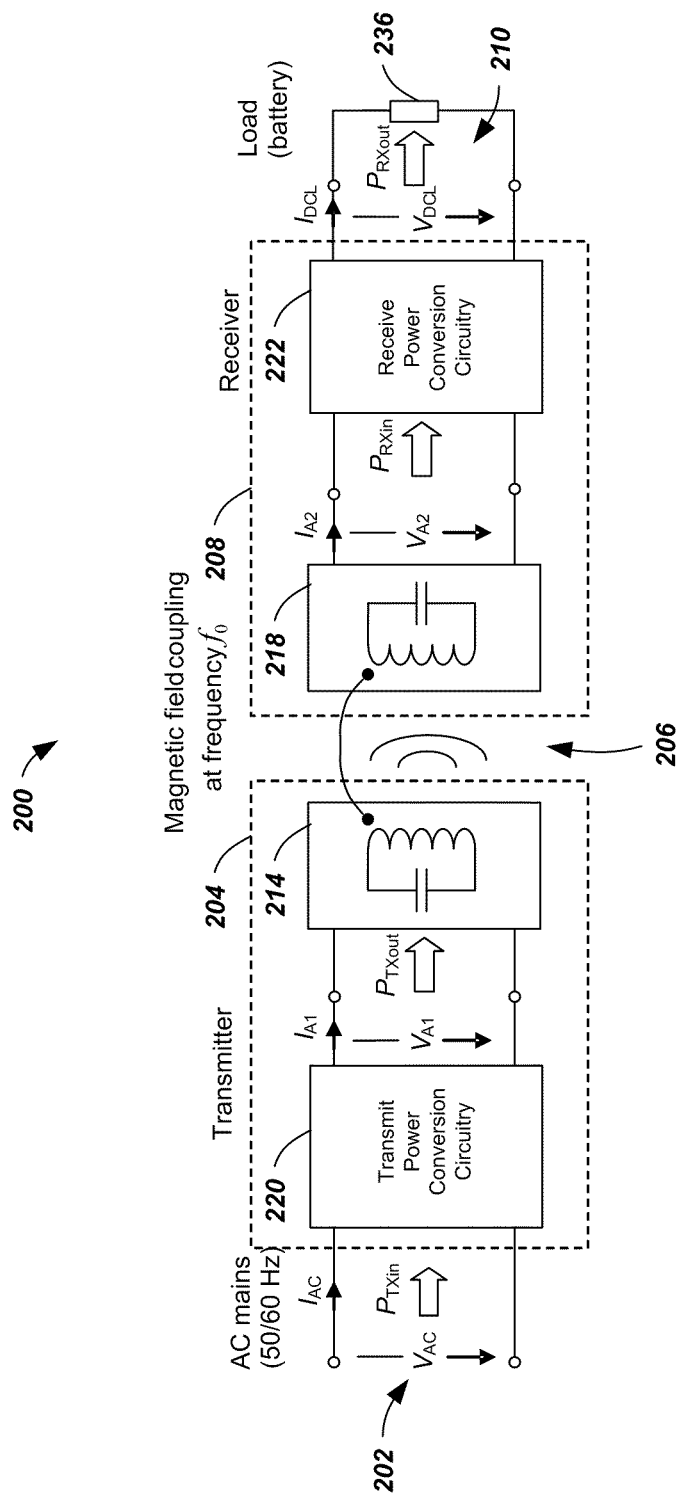
FIG. 4 illustrates a functional block diagram of a wireless power transmission system, in accordance with an exemplary embodiment.

FIG. 4 illustrates a functional block diagram of a wireless power transmission system configured for direct field coupling between a transmitter and a receiver, in accordance with an exemplary embodiment. Wireless power transmission system 200 includes a transmitter 204 and a receiver 208. Input power $P_{TXin}$ is provided to transmitter 204 at input port 202 for generating a predominantly non-radiative field with direct field coupling k 206 for providing energy transfer. Receiver 208 directly couples to the non-radiative field 206 and generates an output power $P_{RXout}$ for storing or consumption by a battery or load 236 coupled to the output port 210. Both the transmitter 204 and the receiver 208 are separated by a distance. In one exemplary embodiment, transmitter 204 and receiver 208 are configured according to a mutual resonant relationship and when the resonant frequency, $f_0$, of receiver 208 and the resonant frequency of transmitter 204 are matched, transmission losses between the transmitter 204 and the receiver 208 are minimal while the receiver 208 is located in the "near-field" of the radiated field generated by transmitter 204.

Transmitter 204 further includes a transmit antenna 214 for providing a means for energy transmission and receiver 208 further includes a receive antenna 218 for providing a means for energy reception. Transmitter 204 further includes a transmit power conversion circuit 220 at least partially functioning as an AC-to-AC converter. Receiver 208 further includes a receive power conversion circuit 222 at least partially functioning as an AC-to-DC converter.

Various transmit and receive antenna configurations described herein use capacitively loaded wire loops or multi-turn coils forming a resonant structure that is capable to efficiently couple energy from transmit antenna 214 to the receive antenna 218 via the magnetic field if both the transmit antenna 214 and receive antenna 218 are tuned to a common resonance frequency, $f_0$. Accordingly, highly efficient wireless charging of electronic devices (e.g. mobile phones) in a strongly coupled regime is described where transmit antenna 214 and receive antenna 218 are in close proximity resulting in coupling factors typically above 30%. Accordingly, various transmitter and receiver power conversion concepts comprised of a wire loop/coil antenna and power conversion circuits are described herein.

While wireless power transmission may occur when one device in a wireless power transmission system includes a transmitter and another device includes a receiver, a single device may include both a wireless power transmitter and a wireless power receiver. Accordingly, such an embodiment could be configured to include dedicated transmit circuitry (e.g., a transmit power conversion circuit and a transmit antenna) and dedicated receiver circuitry (e.g., a receive antenna and a receive power conversion circuit). Since a device is not concurrently configured as a wireless power transmitter and a wireless power receiver, reuse of common circuitry including antennas is desirable. Accordingly, the various exemplary embodiments disclosed herein identify bidirectional power transmission, namely, the capability for a device to both receive wireless power at the device and to transmit wireless power from the device.

Various benefits of such a configuration include the ability of a device receive and store wireless power and then to subsequently transmit or "donate" stored power to another receiving or "absorbing" device. Accordingly, such a configuration may also be considered as a "peer-to-peer" "charitable" charging configuration. Such a device-charging arrangement provides considerable convenience in location under which charging occurs (i.e., the receiver or "absorbing" device need not necessarily receive a charge from an inconveniently located or unavailable charging pad).

Figure 5A:
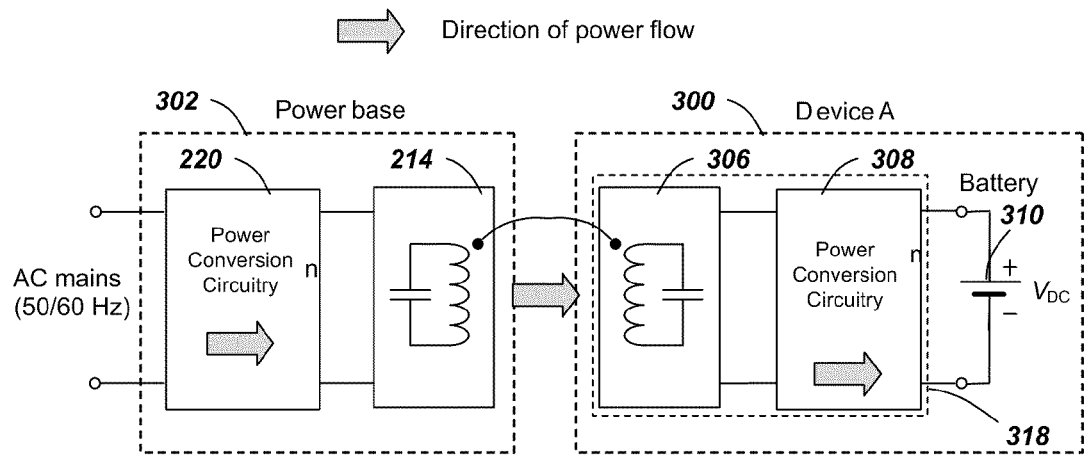
FIG. 5A and FIG. 5B illustrate a bidirectional wireless power device, in accordance with an exemplary embodiment.
Figure 5B:
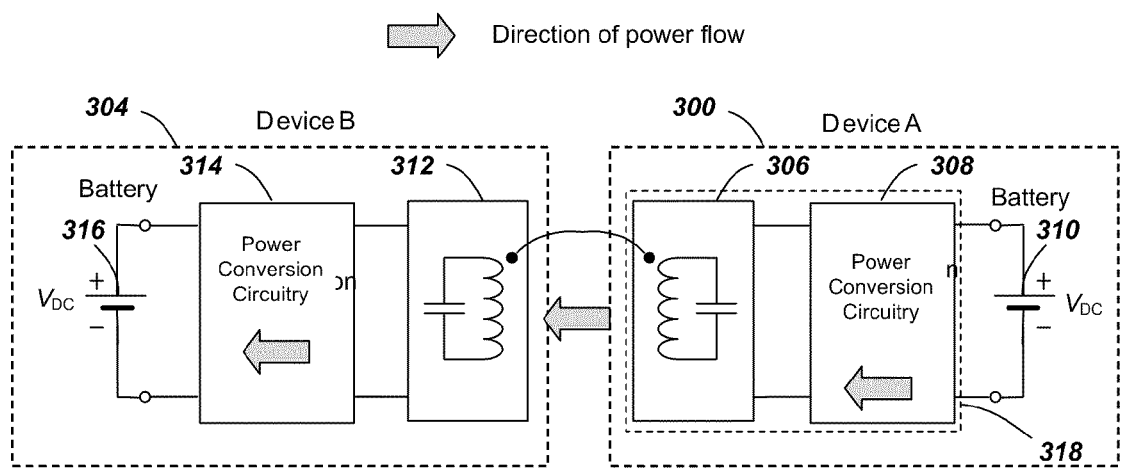

FIG. 5A and FIG. 5B illustrate a bidirectional wireless power device, in accordance with an exemplary embodiment. Bidirectional wireless powering and charging of electronic devices (e.g. mobile phones, head sets, MP3 players, etc.) is disclosed in which electrical energy can be wirelessly transferred, as illustrated in FIG. 5A, from a power conversion circuit 220 and transmit antenna 214 of a power base 302 (e.g. charging pad) to a bidirectional wireless power transceiver 318 including a transceiver antenna 306 and a bidirectional power conversion circuit 308 of an electronic device 300 as illustrated in FIG. 5B. Then, as illustrated with reference to FIG. 5B, the wirelessly transmitted power is stored in a load illustrated as battery 310. The stored power in battery 310 is then donated through the bidirectional power conversion circuit 308 and transceiver antenna 306 of electronic device 300 to a receive antenna 312 and a power conversion circuit 314 of another electronic device 304 for consumption or storage in load or battery 316.

As described herein, wireless power transfer uses coupled resonance (e.g.

capacitively loaded wire loop/coil) that is capable of efficiently coupling energy from a transmitter to a receiver via the magnetic or electric field if both transmitter and receiver are tuned to a common resonance frequency. The various exemplary embodiments described herein include a wireless power transceiver including a resonant antenna 306 and a bidirectional power conversion circuit 308 that can be operated in at least two quadrants, meaning that bidirectional power conversion circuit 308 can either be used as power sink (i.e., positive power flow) or as a power source (i.e., negative power flow). The wireless power transceiver 300 integrated into electronic devices enables wireless exchange of electrical energy among similarly configured electronic devices. The bidirectional power conversion circuit 308 may include a synchronous rectifier as described herein.

As stated, electronic device 300 is configured for bidirectional wireless power transmission. With further reference to FIG. 5A, in a receiving or "absorbing" mode, battery (e.g., power storage device) 310 may be wirelessly charged from an AC mains supplied power base (e.g. charging pad) 302. With further reference to FIG. 5B, electronic device 300 may be operated in reverse in a transmit or "donor" mode for transmission of wireless power to another electronic device 304 for operation and storage at a battery 316 that is used to power the electronic device 304.

Figure 6A:
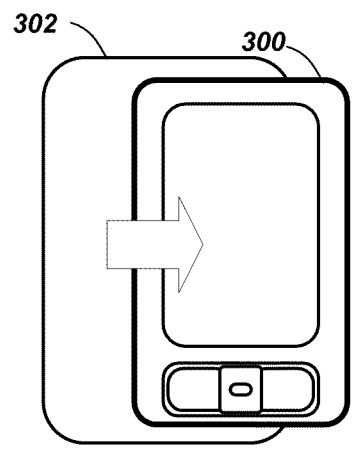
FIG. 6A and FIG. 6B illustrate various operational contexts for an electronic device configured for bidirectional wireless power transmission, in accordance with exemplary embodiments.
Figure 6B:
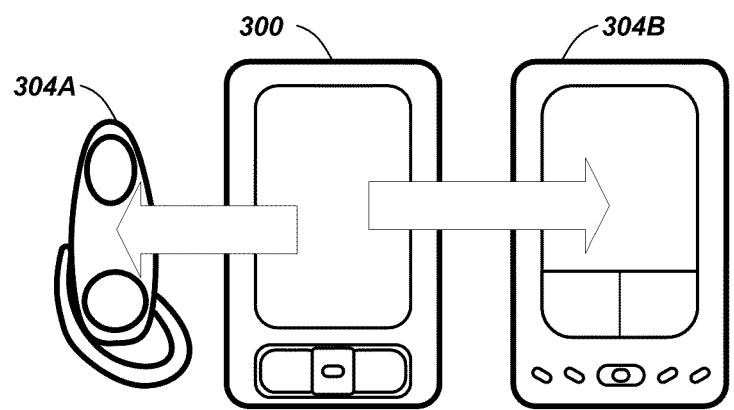

FIG. 6A and FIG. 6B illustrate various operational contexts for an electronic device configured for bidirectional wireless power transmission, in accordance with exemplary embodiments. Specifically, an electronic device 300 configured for bidirectional wireless power transmission engages in wireless power transmission with a power base 302 wherein electronic device 300 receives wireless power and stores the received power in a battery. Subsequently electronic device 300 is solicited, volunteers or otherwise is enlisted as a donor of stored power. Accordingly, one or more electronic devices 304A, 304B receive power from electronic device 300 through a wireless power transmission process.

It is contemplated that the wireless transmission process with electronic device 300 operating in donor mode, may be to provide power replenishment e.g. in an urgency, or at least temporary charge, to another device 304B, or the charging of a micro-power device 304A, such as headsets, MP3 players, etc. For this purpose, device A is set into donor mode via a user interface or responsive to allowed solicitations. Furthermore, donor electronic device 300 may also perform energy management of its own available power to avoid excessive depletion of stored power within the battery of the donor electronic device 300. Accordingly, assuming a standardized wireless power interface, devices may be recharged or partially recharged almost everywhere from any wireless power device that can act as donor electronic device and that provides sufficient battery capacity.

Figure 7:
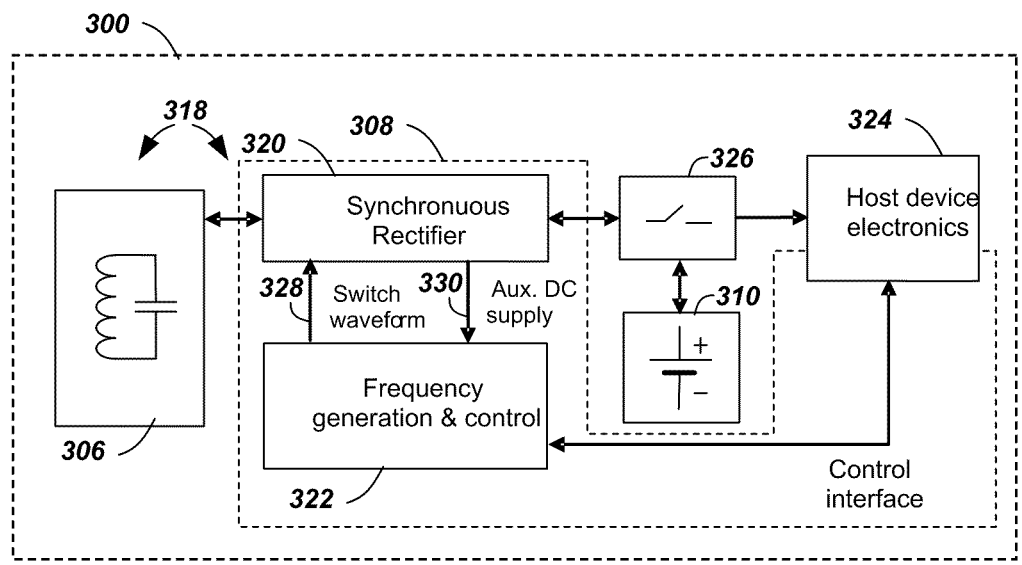
FIG. 7 illustrates a block diagram of an electronic device configured for bidirectional wireless power transmission, in accordance with an exemplary embodiment.

FIG. 7 illustrates a block diagram of an electronic device configured for bidirectional wireless power transmission, in accordance with an exemplary embodiment. The electronic device 300 includes an antenna 306, a bidirectional power conversion circuit 308 and a switch 326 for supplying power to the battery 310 or directly to the host device electronics 324. Bidirectional power conversion circuit 308 includes an active rectifier, an example of which is a synchronous rectifier 320, and can be operated in at least two quadrants of the VI-plane.

Bidirectional power conversion circuit 308 further includes a frequency generation and control circuit 322 for generating the switch waveforms 328 required to operate synchronous rectifier 320 in the desired (transmit or receive) mode and to control the extent to which the electronic device shares its power stored in battery 310 while in donor mode. Frequency generation and control circuit 322 is controlled by control within the host device electronics 324 which also performs battery management and provides a user interface for selection of donor mode. Furthermore, synchronous rectifier 320 may also provide power to frequency generation and control circuit 322 during receive mode when power from battery 310 is depleted or otherwise unavailable.

Figure 8:
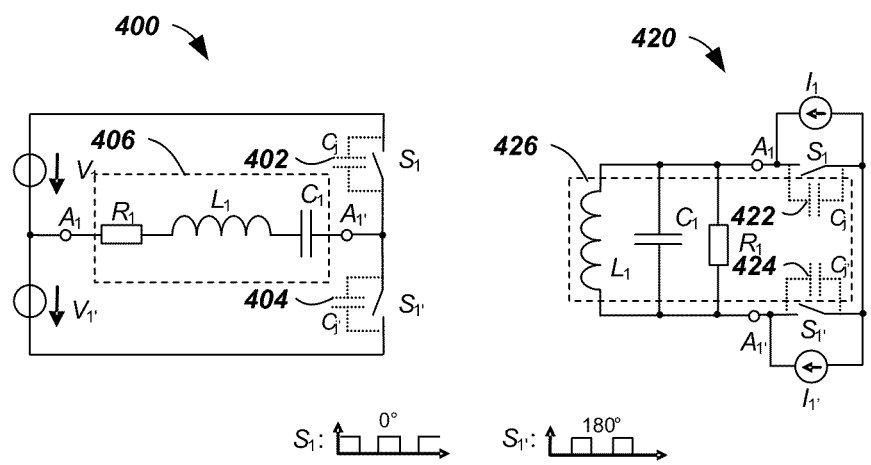
FIG. 8 illustrates a circuit diagram of a half bridge rectifier.

As described, the active rectifier in bidirectional power conversion circuit 306 may be configured as a synchronous rectifier. FIG. 8 illustrates circuit diagrams of a half bridge rectifier topology 400 including a series resonant magnetic antenna and its dual topology 420 including a parallel resonant magnetic antenna where 'dual' refers to the dualism of electrical circuits that is well known in electrical engineering. A synchronous rectifier circuit further described below is based upon a half bridge inverter (push-pull Class D amplifier) topology further arranged in a dual configuration. The dual configuration provides performance benefits at higher frequencies (at HF, e.g. >1 MHz) with respect to switching losses and soft switching and is applicable to transmit and receive power conversion.

As illustrated in circuit 400, conventional half bridge inverter designs include shortcomings relating to switching losses affecting the resonance of antenna 406 caused by junction capacitance of switch transistors. As illustrated in FIG. 8, even when soft switching at zero current control is applied, junction capacitance $C_j$ 402 needs to be charged and $C_{j'}$ 404 to be discharged or vice-versa at each switching event, causing significant losses at higher frequency. This in contrast to its dual counterpart (i.e., serial-to-parallel conversion) where junction capacitances $C_j$ 422 and $C_{j'}$ 424 may be considered merged into a total capacitance comprised of $C_1$ and junction capacitances $C_j$ 422 and $C_{j'}$ 424. The total capacitance is then adjusted to achieve resonance in the antenna 426 at the desired frequency.

Figure 9:
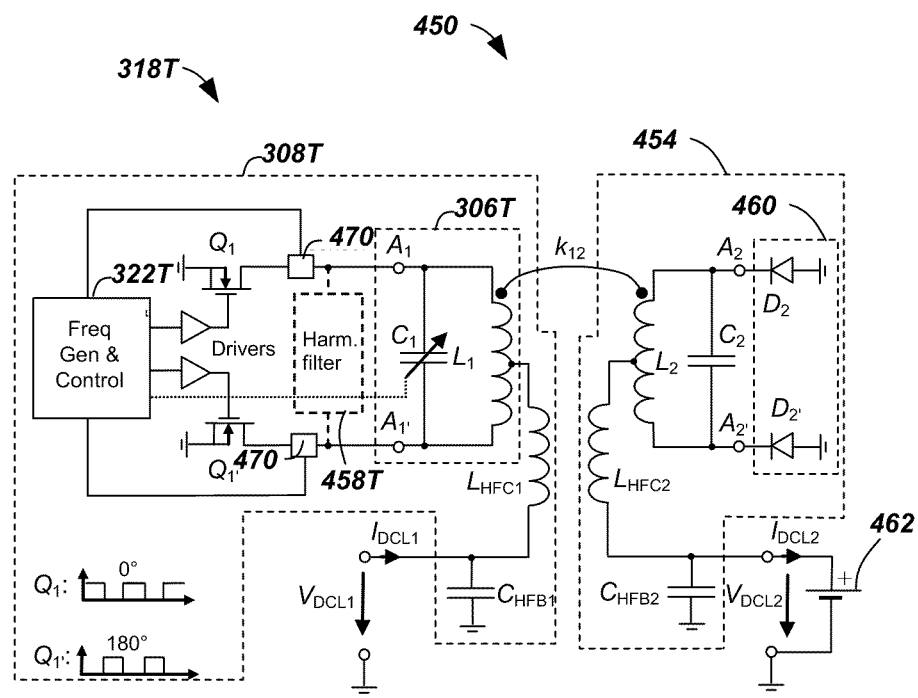
FIG. 9 illustrates a circuit diagram of a wireless power transmission system, in accordance with an exemplary embodiment.

The circuit topology of circuit 420 performs with low dV/dt voltage across switches $S_1$, $S_{1'}$ and enables zero voltage switching, similar to Class E amplifier circuits. FIG. 9 illustrates a circuit diagram of a wireless power transmission system, in accordance with an exemplary embodiment. A wireless power transmission system 450 includes a bidirectional wireless power transceiver 318T (where "T" indicates a Transmitter configuration) with a half bridge active rectifier configured with the switching capacitance of switches $Q_1$ and $Q_{1'}$ merged into the resonance capacitance $C_1$ and a receiver 454.

Bidirectional wireless power transceiver 318T includes a bidirectional power conversion circuit 308T and an antenna 306T. In bidirectional power conversion circuit 308T, a half bridge active rectifier includes switches $Q_1$ and $Q_{1'}$, such as a pair of matched Field Effect Transistors (FETs) with adequate voltage and current ratings. The FET switches $Q_1$ and $Q_{1'}$ are driven and accurately controlled by a frequency generation and control circuit 322T as further monitored by sensors 470 for sensing voltage and current on both FET switches $Q_1$ and $Q_{1'}$. Furthermore, low loss zero voltage switching, also relies upon accurate tuning of the tank circuit of transmit antenna, $L_1$ and $C_1$, to eliminate any phase shift between tank voltage and the FETs rectangular current waveform. In an exemplary embodiment this tuning may be performed by adjusting the capacitor $C_1$.

Though even harmonics are potentially suppressed by the symmetric topology (push-pull), odd harmonics filtering in form of a series resonant L-C circuits e.g. tuned to $3^{rd}$ harmonic may additionally be useful. This may be accomplished using additional series resonance, illustrated as harmonic filter 458T, tuned to harmonic frequencies across the tank circuit of transmit antenna, $L_1$ and $C_1$.

In a unidirectional device (receiver) 454, a half bridge passive diode rectifier 460 is particularly suitable with regard to low voltage/high current charging of a battery 462 (e.g. Li-Ion). Half bridge passive diode rectifier 460 transforms the low load resistance of battery 462 into higher impedance enabling an antenna tank circuit with a realizable L-C ratio for improving receiver efficiency.

Figure 10:
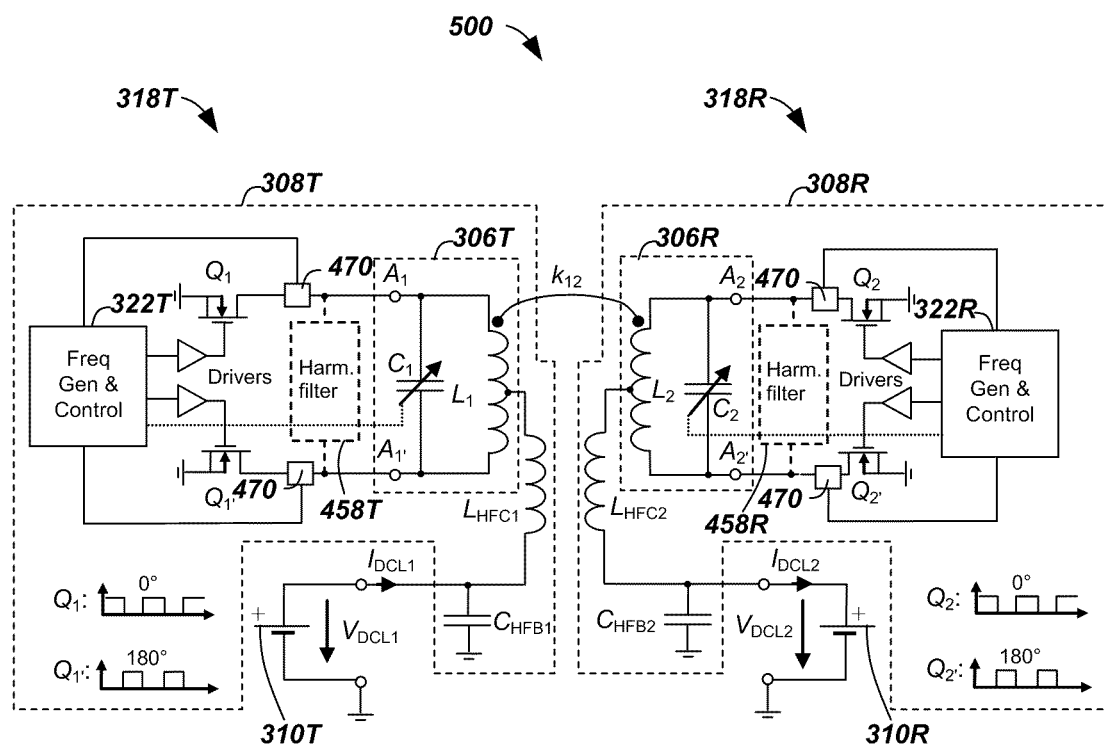
FIG. 10 illustrates a circuit diagram of a wireless power transmission system, in accordance with another exemplary embodiment.

FIG. 10 illustrates a circuit diagram of a wireless power transmission system, in accordance with another exemplary embodiment. This exemplary embodiment enables exchange of energy from one battery operated device to another battery operated device equally in both directions. A wireless power transmission system 500 includes a bidirectional wireless power transceiver 318T (where "T" indicates a Transmitter configuration or transmit mode) and a bidirectional wireless power transceiver 318R (where "R" indicates a Receiver configuration or receive mode).

Bidirectional wireless power transceiver 318T includes a bidirectional power conversion circuit 308T and an antenna 306T. In bidirectional power conversion circuit 308T, a half bridge active rectifier includes switches $Q_1$ and $Q_{1'}$, such as a pair of matched Field Effect Transistors (FETs) with adequate voltage and current ratings. The FET switches $Q_1$ and $Q_{1'}$ are driven and accurately controlled by a frequency generation and control circuit 322T as further monitored by sensors 470 for sensing voltage and current on both FET switches $Q_1$ and $Q_{1'}$. Furthermore, low loss zero voltage switching, also relies upon accurate tuning of the tank circuit of transmit antenna 306T, $L_1$ and $C_1$, to eliminate any phase shift between tank voltage and the FETs rectangular current waveform. In an exemplary embodiment this tuning may be performed by adjusting capacitor $C_1$.

Though even harmonics are potentially suppressed by the symmetric topology (push-pull), odd harmonics filtering in form of a series resonant L-C circuits e.g. tuned to $3^{rd}$ harmonic may additionally be useful. This may be accomplished using additional series resonance, illustrated as harmonic filter 458T, tuned to harmonic frequencies across the tank circuit of transmit antenna, $L_1$ and $C_1$.

Bidirectional wireless power transceiver 318R includes a bidirectional power conversion circuit 308R and an antenna 306R. In bidirectional power conversion circuit 308R, a half bridge active rectifier includes switches $Q_2$ and $Q_{2'}$, such as a pair of matched Field Effect Transistors (FETs) with adequate voltage and current ratings. The FET switches $Q_2$ and $Q_{2'}$ are driven and accurately controlled by a frequency generation and control circuit 322R as further monitored by sensors 470 for sensing voltage and current on both FET switches $Q_2$ and $Q_{2'}$. The drive waveforms may be continuously adjusted in the manner of a phase-locked-loop to reach frequency and phase synchronization with the antenna induced current such to provide maximum or the desired DC power output. As opposed to transmit mode requirements on tuning of the tank circuit of receive antenna, $L_2$ and $C_2$, in receive mode is less critical and some offset from resonance may be tolerated. Thus adjustment e.g. of capacitor $C_2$ may be less accurate or not be used at all.

Though even harmonics are potentially suppressed by the symmetric topology (push-pull), odd harmonics filtering in form of a series resonant L-C circuits e.g. tuned to $3^{rd}$ harmonic may additionally be useful. This may be accomplished using additional series resonance, illustrated as harmonic filter 458R, tuned to harmonic frequencies across the tank circuit of transmit antenna, $L_1$ and $C_1$.

In receive or absorbing mode, the bidirectional power conversion circuit 308 acts as a synchronous rectifier and switches are controlled based on sensed voltage. The exemplary embodiments may also include shunt diodes (not shown) across switches $Q_1$ and $Q_{1'}$. These switches $Q_1$ and $Q_{1'}$ ensure that the circuit is self recovering in the event the battery is depleted. Specifically, the circuit begins to rectify received high frequency power to provide power to the frequency generation and control circuit 322.

Figure 11:
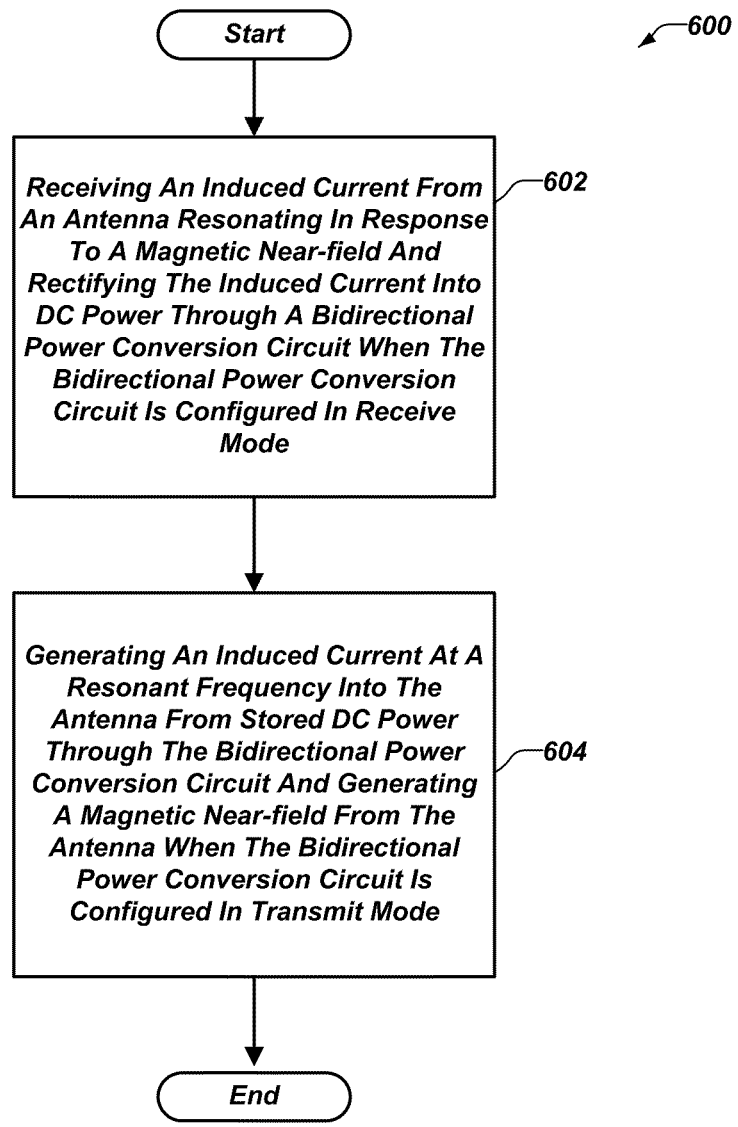
FIG. 11 illustrates a flowchart of a method for transceiving wireless power, in accordance with an exemplary embodiment.

FIG. 11 illustrates a flowchart of a method for transceiving wireless power, in accordance with an exemplary embodiment. Method 600 for transceiving wireless power is supported by the various structures and circuits described herein. Method 600 includes step 602 for receiving an induced current from an antenna resonating in response to a magnetic near-field and rectifying the induced current into DC power through a bidirectional power conversion circuit when the bidirectional power conversion circuit is configured in receive mode. Method 600 further includes step 604 for generating an induced current at a resonant frequency into the antenna from stored DC power through the bidirectional power conversion circuit and generating a magnetic near-field from the antenna when the bidirectional power conversion circuit is configured in transmit mode.

Those of skill in the art would understand that control information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, and controlled by computer software, or combinations of both. To clearly illustrate this interchangeability of hardware and software, various illustrative components, blocks, modules, circuits, and steps have been described above generally in terms of their functionality. Whether such functionality is implemented and controlled as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be controlled with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The control steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transceiver, comprising:
   an antenna configured to generate a current signal in response to a received signal having an unmodulated frequency; and
   a power conversion circuit coupled to the antenna, the power conversion circuit comprising a synchronous rectifier configured to rectify the current signal received at the antenna into a direct current (DC), the synchronous rectifier comprising a switch configured to be driven in response to the current signal and a voltage measured at the switch, the power conversion circuit further configured to generate output current into the antenna from a power source.

2. The transceiver of claim 1, wherein the synchronous rectifier includes at least two opposingly activated switches including shunt diodes thereacross to rectify received wireless power prior to activation of the switches.

3. The transceiver of claim 1, wherein the power conversion circuit includes switching capacitance merged into a capacitance in the antenna, and wherein the antenna comprises a resonator.

4. The transceiver of claim 3, wherein a resonant frequency of the resonator is determined based at least in part on the switching capacitance.

5. The transceiver of claim 1, wherein the power conversion circuit is configured to operate as a power source to the antenna and as a power sink from the antenna.

6. The transceiver of claim 1, wherein the power conversion circuit is a bidirectional power conversion circuit.

7. The transceiver of claim 1, wherein the power conversion circuit comprises a control circuit configured to control whether the power conversion circuit rectifies the current signal or generates the output current into the antenna.

8. The transceiver of claim 7, wherein the control circuit is configured to generate a switch waveform that controls the operation of the synchronous rectifier.

9. The transceiver of claim 8, wherein the switch waveform is configured to control an amount of the output current generated into the antenna.

10. The transceiver of claim 7, wherein the switch comprises at least two switches driven by the control circuit, wherein the at least two switches are configured to control whether the synchronous rectifier rectifies the current signal or generates the output current into the antenna, and wherein the control circuit is configured to drive each switch based on a voltage and a current sensed on each respective switch.

11. The transceiver of claim 10, wherein the antenna is tuned by the control circuit to eliminate a phase shift between a tank voltage of the antenna and a current waveform of the at least two switches when in a transmit mode.

12. The transceiver of claim 10, wherein the antenna is tuned to a frequency other than a resonant frequency when in a receive mode.

13. The transceiver of claim 10, wherein the control circuit is configured to generate switch waveforms to drive the at least two switches.

14. The transceiver of claim 13, wherein the control circuit is configured to continuously adjust the switch waveform such that a frequency and a phase of the current signal are synchronized with a frequency and a phase of the switch waveforms when in a receive mode.

15. The transceiver of claim 10, wherein the at least two switches comprise a pair of matched Field Effect Transistors (FETs).

16. The transceiver of claim 10, wherein the at least two switches are configured to enable the power conversion circuit to rectify received high frequency power to provide power to the control circuit when power in the power source is depleted.

17. A device, comprising:
    a battery configured to store and donate power; and
    a wireless power transceiver coupled to the battery and configured to store power in the battery, the wireless power transceiver further configured to transmit power received from the battery through a power conversion circuit wirelessly using an antenna, the power wirelessly received and communicated through the power conversion circuit, the power conversion circuit comprising a synchronous rectifier that includes a switch configured to be driven in response to the power wirelessly received and a voltage measured at the switch.

18. The device of claim 17, wherein the switch comprises switching capacitance associated therewith, the synchronous rectifier configured with the switching capacitance merged with capacitance associated with an antenna, the antenna configured to generate a current signal in response to a received signal having an unmodulated frequency.

19. The device of claim 18, wherein a resonant frequency of the antenna is determined based at least in part on the switching capacitance.

20. The device of claim 17, wherein the synchronous rectifier includes two opposingly activated switches including shunt diodes thereacross to rectify received wireless power prior to activation of the switches.

21. The device of claim 17, further comprising host device electronics configured to restrict donating excessive power from the battery.

22. The device of claim 17, wherein the power conversion circuit is a bidirectional power conversion circuit.

23. The device of claim 17, wherein the power conversion circuit comprises a control circuit configured to control whether the wireless power transceiver stores power wirelessly received in the battery or transmits power received from the battery.

24. The device of claim 23, wherein the control circuit is configured to generate a switch waveform that controls the operation of the synchronous rectifier.

25. The device of claim 24, wherein the switch waveform is configured to control an amount of the power received from the battery.

26. The device of claim 23, wherein the switch comprises at least two switches driven by the control circuit, wherein the at least two switches are configured to control whether the synchronous rectifier stores power wirelessly received in the battery or transmits power received from the battery, and wherein the control circuit is configured to drive each switch based on a voltage and a current sensed on each respective switch.

27. The device of claim 26, wherein the control circuit is configured to tune the antenna to eliminate a phase shift between a tank voltage of the antenna and a current waveform of the at least two switches when the wireless power transceiver transmits power received from the battery.

28. The device of claim 26, wherein the antenna is tuned to a frequency other than a resonant frequency when power is stored in the battery.

29. The device of claim 26, wherein the control circuit is configured to generate switch waveforms to drive the at least two switches.

30. The device of claim 26, wherein the at least two switches comprise a pair of matched Field Effect Transistors (FETs).

31. The device of claim 26, wherein the at least two switches are configured to enable the power conversion circuit to rectify received high frequency power to provide power to the control circuit when power in the battery is depleted.

32. A method for transceiving wireless power, comprising:
receiving a current signal generated by an antenna, the current signal generated in response to a received signal having an unmodulated frequency, and rectifying, by a power conversion circuit comprising a synchronous rectifier that includes a switch configured to be driven in response to the current signal and a voltage measured at the switch, the current signal into DC when the power conversion circuit is configured in a receive mode; and
generating, by the power conversion circuit, an output current received from a power source, the output current passing into the antenna when the power conversion circuit is configured in a transmit mode.

33. The method of claim 32, wherein the rectifying comprises actively converting the current signal into the DC.

34. The method of claim 32, wherein the rectifying the current signal and the generating the output current are synchronously timed based upon generated waveforms.

35. The method of claim 32, wherein generating the output current further includes determining a resonant frequency based in part on switching capacitance in the power conversion circuit.

36. The method of claim 32, further comprising restricting donation of excessive power from a battery when stored DC power is limited.

37. The method of claim 32, wherein rectifying the current signal further comprises rectifying, by a bidirectional power conversion circuit, the current signal.

38. The method of claim 32, further comprising controlling whether the power conversion circuit is configured in the receive mode or the transmit mode.

39. The method of claim 38, further comprising generating a switch waveform that controls the operation of the power conversion circuit.

40. The method of claim 38, wherein controlling whether the power conversion circuit is configured in the receive mode or the transmit mode comprises:
controlling, by at least two switches of the synchronous rectifier, whether the synchronous rectifier is configured in the receive mode or the transmit mode; and
driving each switch based on a voltage and a current sensed on each respective switch.

41. The method of claim 40, further comprising tuning the antenna to eliminate a phase shift between a tank voltage of the antenna and a current waveform of the at least two switches when in the transmit mode.

42. The method of claim 40, further comprising tuning the antenna to a frequency other than a resonant frequency of the antenna when in the receive mode.

43. The method of claim 40, further comprising generating switch waveforms to drive the at least two switches.

44. The method of claim 43, further comprising continuously adjusting the switch waveforms such that a frequency and a phase of the current signal are synchronized with a frequency and a phase of the switch waveforms when in the receive mode.

45. The method of claim 40, wherein the at least two switches comprise a pair of matched Field Effect Transistors (FETs).

46. The method of claim 40, further comprising enabling the power conversion circuit to rectify received high frequency power to provide power to a control circuit when power in the power source is depleted.

47. A wireless power transceiver, comprising:
means for receiving a current signal generated by an antenna, the current signal generated in response to a received signal having an unmodulated frequency when a power conversion circuit is configured in a receive mode;
means for synchronously rectifying the current signal into a direct current (DC) that provides DC power for storage in a battery when the power conversion circuit is configured in the receive mode, the means for synchronously rectifying comprising a means for switching driven in response to the current signal and a voltage measured at the means for switching; and
means for generating output current from a power source, the output current passing into the antenna when the power conversion circuit is configured in a transmit mode.

48. The wireless power transceiver of claim 47, wherein the means for synchronously rectifying comprises means for actively converting the current signal into the DC.

49. The wireless power transceiver of claim 47, wherein the means for synchronously rectifying the current signal and the means for generating the output current are synchronously timed based upon generated waveforms.

50. The wireless power transceiver of claim 47, wherein the means for generating the output current further comprises means for determining a resonant frequency based in part on switching capacitance in the power conversion circuit.

51. The wireless power transceiver of claim 47, wherein the means for synchronously rectifying the current signal further comprises means for rectifying the current signal when a bidirectional power conversion circuit is configured in the receive mode.

52. The wireless power transceiver of claim 47, further comprising means for controlling whether the power conversion circuit is configured in the receive mode or the transmit mode.

53. The wireless power transceiver of claim 52, further comprising means for generating a switch waveform that controls the operation of the power conversion circuit.

54. The wireless power transceiver of claim 52, wherein means for controlling whether the power conversion circuit is configured in the receive mode or the transmit mode comprises at least two switches of the means for synchronously rectifying, wherein the at least two switches are driven based on a voltage and a current sensed on each respective switch.

55. The wireless power transceiver of claim 54, further comprising means for tuning the antenna to eliminate a phase shift between a tank voltage of the antenna and a current waveform of the at least two switches when in the transmit mode.

56. The wireless power transceiver of claim 54, further comprising means for tuning the antenna to a frequency other than a resonant frequency when in the receive mode.

57. The wireless power transceiver of claim 54, further comprising means for generating switch waveforms to drive the at least two switches.

58. The wireless power transceiver of claim 54, further comprising means for continuously adjusting the switch waveforms such that a frequency and a phase of the current signal are synchronized with a frequency and a phase of the switch waveforms when in the receive mode.

59. The wireless power transceiver of claim 54, wherein the at least two switches comprise a pair of matched Field Effect Transistors (FETs).

60. The wireless power transceiver of claim 54, further comprising means for enabling the power conversion circuit to rectify received high frequency power to provide power to a control circuit when power in the power source is depleted.

\* \* \* \* \*